United States Patent [19]

Rantakari

[11] Patent Number: 4,526,334
[45] Date of Patent: Jul. 2, 1985

[54] DEVICE FOR ADJUSTING THE HEIGHT OF DESKTOP, CHAIR OR SIMILAR

[75] Inventor: Pekka Rantakari, Jokela, Finland

[73] Assignee: Martela OY, Finland

[21] Appl. No.: 427,984

[22] Filed: Sep. 28, 1982

[30] Foreign Application Priority Data

Sep. 28, 1981 [FI] Finland ............................... 813005

[51] Int. Cl.³ .............................................. F16M 11/00
[52] U.S. Cl. ..................................... 248/157; 248/412
[58] Field of Search ................... 248/161, 157, 188.5, 248/412; 108/144, 148; 403/109

[56] References Cited

U.S. PATENT DOCUMENTS 4,374,581  2/1983  Karapita ............................. 248/412

FOREIGN PATENT DOCUMENTS 29089  11/1972  Australia ........................... 248/412
528038  4/1954  Belgium ............................ 248/412
1178244  5/1959  France ............................. 248/161

Primary Examiner—Ramon S. Britts
Assistant Examiner—Sarah A. Lechok
Attorney, Agent, or Firm—Steinberg & Raskin

[57] ABSTRACT

Apparatus for adjusting the height of an article, such as a table, chair or the like, includes at least one guide tube mounted in a base and a slide mounted within each guide tube connected to the article whose height is to be adjusted. The slide is locked at a selected position within the guide tube to thereby lock the article at its desired height by means of a locking mechanism which includes at least one wedge member mounted on the slide to define a space which diminishes in size between the wedge member and the guide tube and a corresponding locking member situated within the space and urged therein into engagement with the wedge member and the guide tube. Apparatus are provided for moving the locking member out of its wedged position to unlock the slide.

10 Claims, 4 Drawing Figures

DEVICE FOR ADJUSTING THE HEIGHT OF DESKTOP, CHAIR OR SIMILAR

BACKGROUND OF THE INVENTION

The present invention relates generally to apparatus for adjusting the height of a table, chair or like article. In particular the present invention relates to height adjusting apparatus of the type which includes a base to which at least one substantially vertical guide is connected and a table or the like connected to a slide which is movable within the guide and wherein a locking mechanism is provided for locking the table or the like at a desired height.

It is desirable in many instances to provide a table or the like with the capability of having its height adjusted to suit particular circumstances. For example, in cases where a table supports a keyboard, such as for use in connection with a computer terminal, an adjustability of the height of the table to suit the particular requirements of an operator is advantageous.

The most expeditious arrangement for providing a table or the like with a height adjusting capability is to connect one or more slides to the table and to situate the slides within corresponding substantially vertical guide tubes so that the slides can be telescoped within the guide tubes. In the past, the slides have been locked at their desired position within the guide tubes by one of two basic ways. In one arrangement, a plurality of bores may be formed in one of the guide tubes or slides and one or more bores formed in the other so that the bores in the respective elements are alignable with each other whereupon a pin or the like can be inserted into aligned bores to lock the slide within the guide member. However, this arrangement is disadvantageous in that removal of the pin for subsequent readjustment of the height is inconvenient and, moreover, only a stepwise or discreet rather than continuous adjustment can be achieved. In another arrangement, a clamp or set-screw is provided in the guide which can be tightened when the slide is at its desired position. However, this arrangement is disadvantageous in that since the thread of the set-screw or clamp will be subjected to large stresses when it is tightened, an inherent weakness in the structure exists.

It is the primary object of the present invention to provide new and improved apparatus for adjusting the height of a table, chair or the like which overcomes the problems of the prior art described above.

Another object of the present invention is to provide new and improved apparatus for adjusting the height of a table, chair or the like which is simple to use, quick and reliable in operation, and wherein the slide is free of any wobble or play within the corresponding guide tube to provide a rigid construction.

Briefly, in accordance with the present invention these and other objects are attained by providing in the slide-guide tube arrangement described above, a locking mechanism including at least one wedge member mounted on the slide and at least one locking member positioned in the space defined between the wedge member and the guide tube. The locking member, which preferably takes the form of a rod, is normally urged into a wedged position in mutual engagement with the wedge surface of the wedge member and the guide tube to prevent movement of the slide within the guide tube. A releasing mechanism is also provided for moving the locking member in a substantially vertical direction out of its wedge position to permit the position of the slide to be adjusted within the guide tube.

The use of a wedge member as the locking mechanism in apparatus for adjusting the height of a table, chair or the like is advantageous in that it allows a continuous or infinite adjustment of the height of the slide while providing an efficient and rigid locking of the slide to the guide tube. In connection with the latter advantage, the use of a wedge and associated locking member results in a stronger locking force being created the larger the load to which the table, chair or the like is subjected.

According to a preferred embodiment of the invention, the locking member is urged into wedging engagement in the space defined between the wedge member and the guide tube by means of spring means. The releasing mechanism includes a releasing arm extending along the guide tube which is coupled to the locking member and which can be actuated to move the latter out of its wedging position to release the slide for movement within the guide tube. In accordance with another feature of the invention, the releasing arm advantageously extends to the region of the table or the like and a lever is provided through the pivoting of which the releasing arm is moved in the direction of the guide tube. The lever may be situated in proximity to the front edge of the table or chair in which case the adjustment of the height can be accomplished in a quick and easy manner.

If the table or the like is relatively light and it is desired to secure the same so as to also prevent upward movement thereof, in accordance with another feature of the present invention, at least one wedge member and corresponding locking member is provided for preventing the downward motion of the slide within the guide tube and at least one wedge member and corresponding locking member is provided for also preventing the upward movement of the slide within the guide tube. Where this feature is provided, the releasing mechanism may be constituted by a pair of releasing arms, one of which functions to move the first locking member in a downward direction to allow downward movement of the slide within the guide tube whereas the second releasing arm functions to move the second locking member upwardly for allowing the slide to be raised within the guide tube. At least one spring means are provided for urging the locking members into the respective wedged positions. The apparatus may be designed so that a lever situated in the vicinity of the table or the like will function to move the first releasing arm downwardly and at the same time move the second releasing arm upwardly to allow the slide to be either lowered or raised within the guide tube.

The apparatus is preferably constructed in a symmetrical manner wherein the locking apparatus comprises a pair of first wedge members and a corresponding pair of first locking members which function to prevent downward movememt of the slide means and a pair of second wedge members and a corresponding pair of second locking members which function to prevent the upward movement of the slide within the guide tube.

DESCRIPTION OF THE DRAWINGS

A more complete appreciation of the present invention and many of the attendant advantages thereof will be readily understood by reference to the following detailed description when considered in connection with the accompanying drawings in which.

DESCRIPTION OF THE PREFERRED EMBODIMENTS

Figure 1:
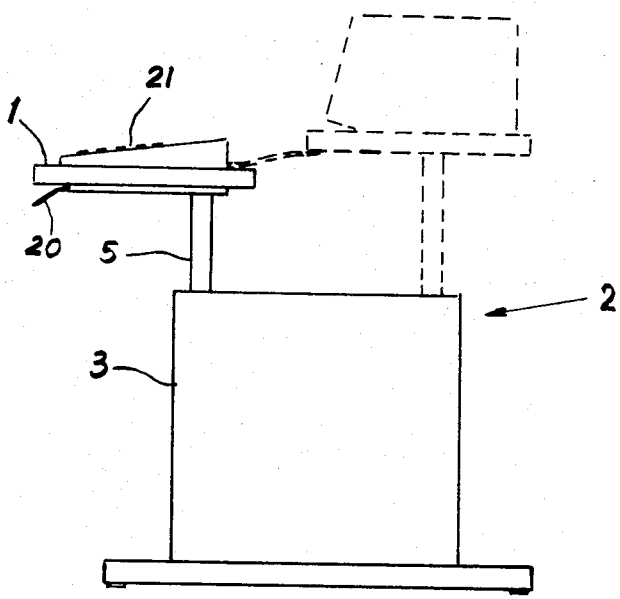
FIG. 1 is a schematic side elevation view of a table and apparatus for adjusting the height thereof in accordance with the present invention.
Figure 2:
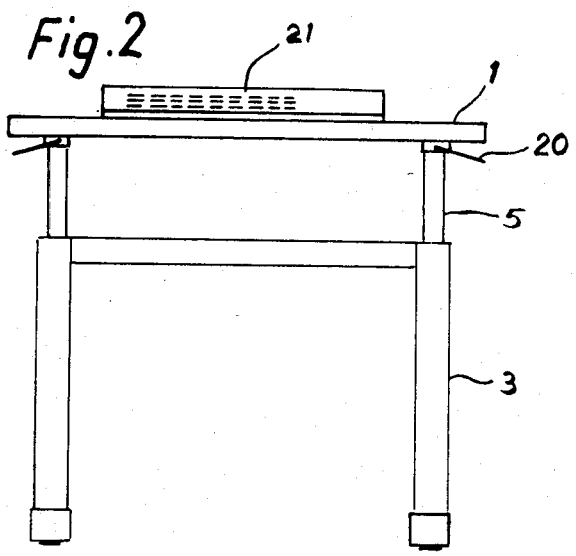
FIG. 2 is a schematic front elevation view of the table and apparatus illustrated in FIG. 1.

Referring now to the drawings wherein like reference characters designate identical or corresponding parts throughout the several views, and more particularly to FIGS. 1 and 2, a keyboard table 1 on which a keyboard 21 is placed is supported on a base 3 by means of height adjusting apparatus in accordance with the present invention. A CRT table, shown in phantom, may also be supported on the base 3. With reference to FIGS. 1 and 2, the keyboard table 1 is supported on base 3 by a pair of vertical slide tubes 5, the heights of which are adjustable as described below so that the height of table 1 is correspondingly adjustable. Thus, the height of table 1 is adjusted by turning a lever 20 to release a locking mechanism whereupon the table 1 can be adjusted to its desired height. The table 1 is then locked in position by returning lever 20 to its original position.

It will be understood that the invention is of course not limited to use in connection with tables of the type illustrated and described herein but is applicable to any type of apparatus or article whose height is desirably adjustable such, for example, as other types of tables, desks, chairs and the like.

Figure 3:
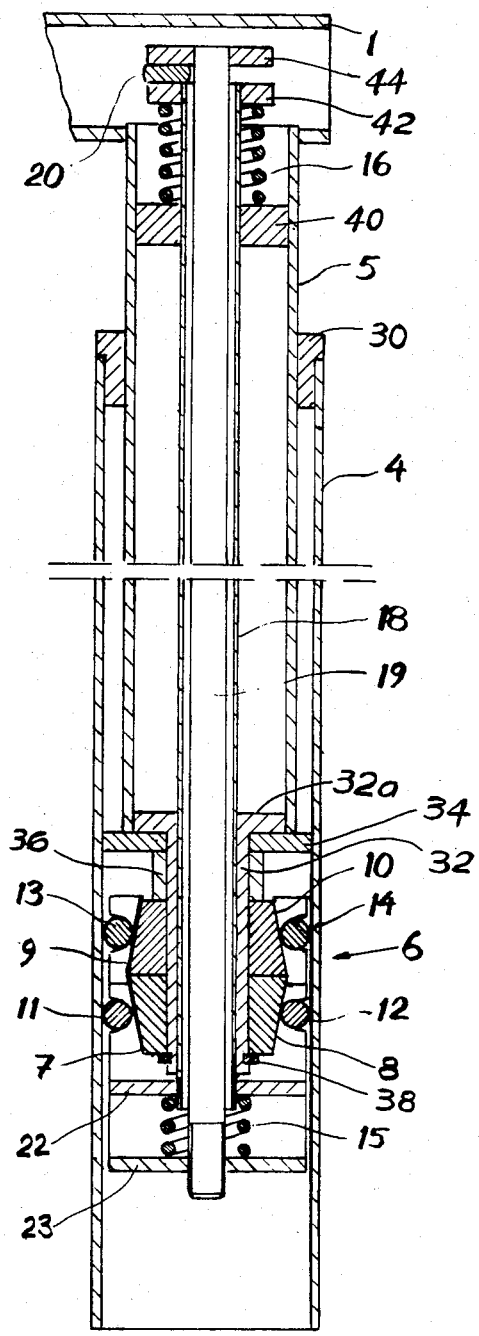
FIG. 3 is a front view in partial section of height adjusting apparatus in accordance with the present invention.
Figure 4:
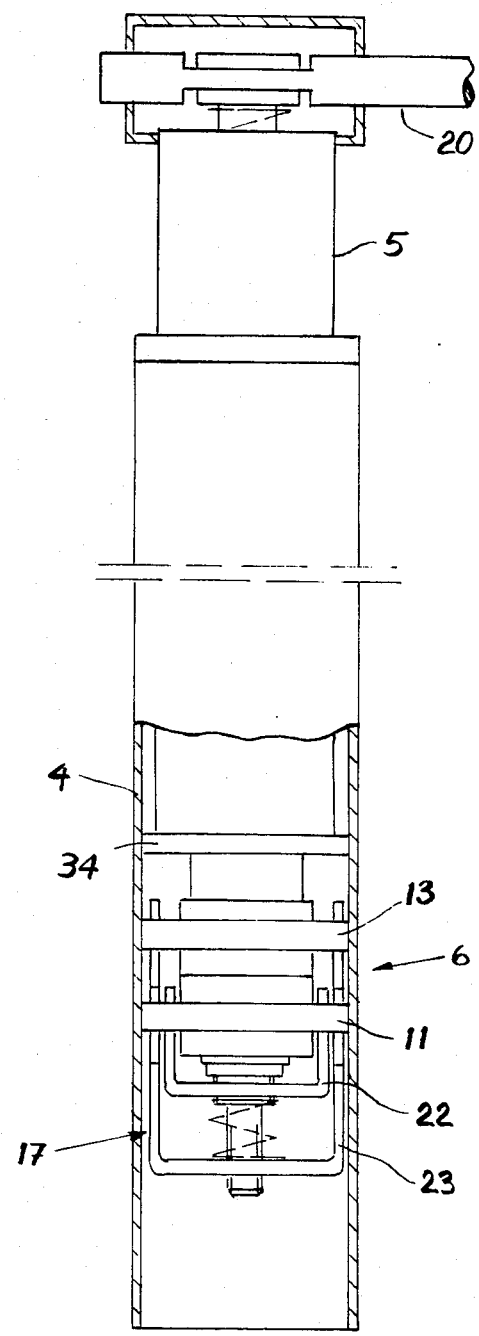
FIG. 4 is a side view and partial section of the apparatus illustrated in FIG. 3.

Referring now to FIGS. 3 and 4, one embodiment of height adjusting apparatus in accordance with the present invention is shown in detail. A slide tube 5 acting to support the table 1 as described above is telescopingly received in a corresponding guide tube 4 mounted within the base 3, i.e., the slide tube 5 is axially slidable within the guide tube 4. The guide tube 4 preferably has a square or rectangular cross-section and an upper end of the guide tube 4 is closed by a cap 30 having a central opening through which the slide tube 5 passes. A downwardly extending ferrule 32 is fixed to slide tube 5 by means of an integral flange 32a and a guide plate 34 having an outer configuration which conforms to the cross-section configuration of the bore of guide tube 4 is fixed to the lower end of slide tube 5. It will be understood that by this construction the slide tube 5 will slide within the guide tube 4 in the direction of its axis without any wobble or play.

The slide tube 5 and associated structure fixed to it including the ferrule 32 and plate 34 thus comprise slide means whose position within the guide tube 4 can be axially adjusted. A locking device, generally designated 6, is connected to the slide means and functions to lock or fix the slide means in the guide tube 4 when the table 1 is at its desired height. In the illustrated embodiment, the locking device is generally constituted by four wedge members 7, 8, 9 and 10 and corresponding rods 11, 12, 13 and 14 adapted to be wedged into the spaces defined between respective wedge members and the guide tube 4 so as to mutually engage the outer wedge surfaces of the wedge members and the guide tube to thereby lock the slide means at a fixed position within the guide tube as described in detail below.

The wedge members are fixed over the ferrule 32 between a bushing 36 and a retaining ring 38. The wedge surfaces of wedge members 9 and 10 progressively approach the sides of guide tube 4 in the downward direction to define respective spaces therewith which diminish in size in the downward direction. On the other hand, the wedge surfaces of wedge member 7 and 8 progressively diverge from the sides of guide tube 4 in the downward direction to define respective spaces therewith which diminish in size in the upward direction.

The rods 11, 12, 13 and 14 are each held in the spaces defined between the guide tube 4 and the wedge surfaces of wedge members 7, 8, 9 and 10 respectively by means of a pair of substantially U-shaped rod holders 22 and 23. More particularly, rods 11 and 12 are held in their respective spaces adjacent to wedge members 7 and 8 by rod holder 22 while rods 13 and 14 are held in their respective spaces adjacent to wedge members 9 and 10 by rod holder 23. It will be appreciated that when the rods 11 and 12 are wedged in their respective spaces, i.e., mutually engage the wedge surfaces of their respective wedge members 7 and 8 and the inner surface of guide tube 4, i.e., when the rods 11 and 12 are urged in an upward direction, the rods 11 and 12 will prevent the slide means for moving downwardly within the guide tube 4. Similarly, when the rods 13 and 14 mutually engage the wedge surfaces of respective wedge members 9 and 10 and the inner surface of guide tube 4, i.e., when the rods 13 and 14 are urged in a downward direction to become wedged within the respective spaces defined thereby, the rods 13 and 14 will prevent the slide means from moving upwardly within the guide tube 4. Thus, the rods function as locking members in the operation of the apparatus as described below.

A first tubular releasing arm 18 is axially slidably mounted within slide tube 5 passing through a central aperture formed within an insert 40 fixed within slide tube 5 with its lower end passing through and protruding below the ferrule 32 and connected to rod holder 22. A second releasing arm 19 slides within the bore of the first tubular releasing arm 18 and has a lower end which extends beyond the lower end of releasing arm 18 where it is fixed to the rod holder 23. Both releasing arms extend upwards to the region of the table 1. A compression spring 15 is situated over the lower end of arm 19 so that its ends bear against the rod holders 22 and 23. Thus, the spring 15 normally urges the rod holder 22 and the rods 11 and 12 held thereby in an upward direction to situated the same in their wedged positions while at the same time urges the rod hold 23 and the rods 13 and 14 held thereby in a downward direction to similarly urge rods 11 and 12 into their respective wedged positions.

In operation, under normal conditions, the table 1 is locked at a certain height by virtue of the spring 15 urging the rod holder 22 upwardly to press the rods 11 and 12 against the wedge surfaces of wedge member 7 and 8 and the sides of guide tube 4 thereby preventing downward movement of the slide means within the guide tube. At the same time, the spring 15 urges the rod holder 23 downwardly to press the rods 13 and 14 against the wedge surfaces of wedge members 9 and 10 and the sides of guide tube 4 thereby preventing upward movement of the slide means within the guide tube.

The slide means is released by means of releasing means, generally designated 17, which are constituted by the first tubular releasing arm 18 fixed to rod holder 22 and the second releasing arm 19 fixed to the rod holder 23. Flanges 42 and 44 are fixed to the upper ends of arms 18 and 19 respectively and a segment of lever 20 extends between flanges 42 and 44. The lever 20 is constructed such that when the same is appropriately pivoted the releasing arm 18 is moved downwardly against the force of a spring 16 whose ends engage the flange 42 and insert 40 while the releasing arm 19 is moved upwardly. In this manner, the rod holders 22 and 23 are moved downwardly and upwardly respectively thereby moving the rods to a position where they are out of engagement with the respective wedge members thereby unlocking the slide means with respect to the guide tube 4. At this time the table 1 may be repositioned to a desired height. When the lever is pivoted back to its locked position, the springs 15 and 16 act to urge the rods in the manner described above against the wedge members thereby locking the slide means with respect to the guide tube 4 whereupon the table 1 is locked at the desired height.

As noted above, the present invention is applicable not only to adjustable height tables but may also be used in connection with other apparatus, such as for adjusting the height of the seating part of chairs, such as office stools, and the like.

Obviously, numerous modifications and variations are possible in the light of the above teachings. For example, it is possible to utilize the invention without a provision for means for preventing the movement of the slide in an upward direction. It is therefore to be understood that within the scope of the claims appended hereto, the invention may be practiced otherwise than as specifically disclosed herein.

What is claimed is:

1. Apparatus for adjusting the height of an article, such as a table, chair or the like, comprising:
a base;
at least one substantially vertical guide tube mounted on said base;
slide means connected to an article whose height is to be adjusted, said slide means being movably mounted within said guide tube;
locking means connected to said slide means for locking said slide means at a selected position within said guide tube to thereby lock the article at a desired height, said locking means including at least one first wedge member mounted on said slide means having a wedge surface which defines a first space with said guide tube which diminishes in size in the upward direction and at least one corresponding first locking member positioned in said first space, and at least one second wedge member mounted on said slide means having a wedge surface which defines a second space with said guide tube which diminishes in size in the downward direction and at least one corresponding second locking member positioned in said second space, said at least one first wedge and locking members constituting means for preventing downward movement of said slide means and said at least one second wedge and locking members constituting means for preventing upward movement of said slide means;
releasing means for moving at least one of said first and second locking members in a substantially vertical direction for locking or releasing said slide means with respect to said guide tube.

2. The combination of claim 1 wherein said locking members comprise rod-shaped members.

3. The combination of claim 1 wherein said locking means includes spring means for normally urging at least one of said locking members within a respective one of said spaces defined between said wedge member and said guide tube in the size diminishing direction thereof to wedge said locking member mutually against said wedge member and said guide tube.

4. The combination of claim 3 wherein said releasing means includes releasing arm means for moving at least one of said locking members within a respective one of said spaces defined between said wedge member and said guide tube in the size increasing direction thereof against the urging of said spring means whereby said locking member is disengaged from said wedge member.

5. The combination of claim 4 wherein said releasing arm means extend to the region of said article whose height is to be adjusted and further including lever means for actuating said releasing arm means to move said locking member to disengage said locking member from said wedge member.

6. The combination of claim 5 wherein said releasing arm means include an elongate releasing arm extending in the direction of said guide tube and wherein said lever means are coupled to said releasing arm to move the same in the longitudinal direction to disengage said locking member from said wedge member.

7. The combination of claim 1 wherein said releasing means includes first releasing arm means for moving said first locking member in a downward direction and second releasing arm means for moving said second locking member in an upward direction, and wherein said locking means include spring means for normally wedging said first and second locking means in said first and second spaces defined by said guide tube and said first and second wedge members.

8. The combination of claim 7 further including lever means for simultaneously moving said first releasing arm in a downward direction and said second releasing arm in an upward direction.

9. The combination of claim 8 wherien said lever means are situated in the vicinity of said article whose height is to be adjusted.

10. The combination of claim 1 wherein said means for preventing downward movement of said slide means comprises a pair of first wedge members and a corresponding pair of first locking members and wherein said means for preventing upward movement of said slide means comprises a pair of second wedge members and a corresponding pair of second locking members.

* * * * *